United States Patent [19]

Aoyama et al.

[11] Patent Number: 4,641,617
[45] Date of Patent: Feb. 10, 1987

[54] DIRECT INJECTION TYPE INTERNAL COMBUSTION ENGINE

[75] Inventors: Taro Aoyama; Yujiro Oshima, both of Aichi, Japan

[73] Assignee: Kabushiki Kaisha Toyota Chuo Kenkyusho, Japan

[21] Appl. No.: 600,717

[22] Filed: Apr. 16, 1984

[30] Foreign Application Priority Data

Apr. 16, 1983 [JP] Japan .................................. 58-67582

[51] Int. Cl.$^4$ ............................................. F02B 19/08
[52] U.S. Cl. .................................... 123/262; 123/275; 123/301; 123/306
[58] Field of Search ..................... 123/193 P, 262, 263, 123/276, 279, 301, 306, 251, 275, 261

[56] References Cited

U.S. PATENT DOCUMENTS 2,762,347  9/1956  Seegelken ........................... 123/276
4,176,628  12/1979  Kanai et al. ........................ 123/276

FOREIGN PATENT DOCUMENTS 2407783  9/1974  Fed. Rep. of Germany ...... 123/276
62312    4/1983  Japan .................................. 123/276
473174   11/1937  United Kingdom ............... 123/276

Primary Examiner—Willis R. Wolfe, Jr.
Assistant Examiner—David A. Okonsky
Attorney, Agent, or Firm—Sughrue, Mion, Zinn, Macpeak and Seas

[57] ABSTRACT

A direct injection type internal combustion engine has a piston reciprocatably fitted in the bore of a cylinder block defining a combustion chamber together with the cylinder block and a cylinder head. A main recess is formed in the combustion chamber for accelerating the swirl of intake air which is prepared and introduced by an intake device. At least one auxiliary recess is formed in the main recess and is arranged in the direction of the intake air swirl and in the direction of the fuel injection of a fuel injector for generating a secondary swirl different from the intake air swirl and for generating turbulence between the two swirls. Thus, the introduction of air into the fuel droplets fed from the fuel injector is promoted by the intake air swirl and the secondary swirl so that the combustion efficiency of the internal combustion engine is improved.

16 Claims, 8 Drawing Figures

DIRECT INJECTION TYPE INTERNAL COMBUSTION ENGINE

BACKGROUND OF THE INVENTION

The present invention relates to a direct injection type internal combustion engine which makes effective use of a swirl of intake air to promote introduction of the air into fuel droplets thereby to improve the combustion efficiency.

In order to improve the combustion efficiency of a reciprocating internal combustion engine thereby to improve the fuel economy and the power output and to reduce the amount of noxious contents in the exhaust gas, it is most important to increase the gas flow rate in the combustion chamber thereby to increase the amount of turbulence. If this is done, the combustion period is shortened.

To increase the amount of the turbulence, a method has been employed whereby the intake swirl is intensified. According to this method, an intake valve is provided with a mechanism for generating a swirl in the intake charge. The valve may, for example, be a shrouded intake valve, a tangential intake port or a helical port which generates a swirl during the intake stroke so that the amount of turbulence is boosted during compression.

A large difficulty concomitant with a small direct injection type Diesel engine of the prior art is the wetting of the wall surface by the injected fuel. The use of the aforementioned method helps to remedy that difficulty.

So long as an intense swirl is present, there arises no problem even if the injected fuel reaches the side wall. When the speed of the engine drops, however, the swirl is weakened, adversely affecting the combustion characteristics. Also, if the engine is driving at low load, the evaporation rate of the fuel is liable to be insufficient because of a drop in the cylinder wall temperature. Also, the emissions of hydrocarbons and white smoke are increased.

On the other hand, generation of an intense swirl is always accompanied by a reduction in the volumetric efficiency. Nevertheless, the following effects of the swirl are expected: (i) an improvement in the dispersion of the fuel droplets, (ii) blowoff of combustion products, and (iii) thermal mixing. Another effect of (iv) suppression of the penetration of the fuel droplets (or of the wall surface from being wetted with the fuel droplets) may also occur.

Moreover, either an internal combustion engine employing a fuel injector in the combustion chamber and an ignition device such as an ignition plug or a direct injection type Diesel engine which is equipped with a direct injection nozzle to increase the compression ratio to ensure auto-ignition of the mixture can employ a method of combining the intake swirl and a squish. In the former, the fuel is injected at a timing of 60 degrees before the TDC in the intake stroke for the case of combustion of a homogeneous mixture. For the case the diffuse combustion is stressed, the fuel is injected at a timing from 60 degrees before TDC to a timing of TDC in the intake stroke. In each case the fuel is directly injected into the combustion chamber so that the sucked air is chilled by the latent heat of evaporation of the fuel and combustion starts at the instant when the air and the fuel are mixed. Compared with a spark ignition type internal combustion engine using a carburetor, there is little danger of knocking. Thus, the compression ratio can be set at a high value.

In such a case, the piston is provided with recesses in the pistons and with intake ports for generating swirls in the suction stroke so that turbulence is generated as aforementioned. Since turbulence is generated immediately before reaching the TDC, the fuel and the air are adequately mixed. However, the strength of the turbulence is insufficient for promoting combustion after reaching the TDC, i.e., after the middle period of the combustion. As a result, combustion in the second half of the combustion period is insufficient, and hence the fuel economy is not sufficient, despite the increased compression ratio. Moreover, since the fuel is directly injected into the combustion chamber, unburned hydrocarbons are liable to be emitted.

In the direct injection type engine, on the other hand, the latter half of the fuel injection cycle is effected when combustion has already started. The compression ignition type direct injection (or Diesel) engine uses a combined method which makes use of both the swirl generated in the suction stroke and the squish generated by providing the piston with a recess, which recess is dish shaped or toroidally shaped. As a result, at the time of forming the mixture, especially at the initial state thereof, the swirl and the intense squish advantageously disperse the fuel. However, after the middle period of combustion, the turbulence may weaken, causing a deterioration in the fuel economy and the emission of black smoke.

SUMMARY OF THE INVENTION

The present invention has been conceived to solve the several problems concomitant with the prior art thus far described, and an object thereof is to provide a direct injection type internal combustion engine which makes effective use of the swirl of intake air to efficiently generate and maintain turbulence to promote the mixing of air with the fuel droplets so that the combustion after the middle period of the combustion cycle is accelerated to shorten the combustion period, thereby to improve the combustion efficiency.

Another object of the present invention is to provide a direct injection type internal combustion engine having ignition means, which shortens the combustion period, thereby to reduce the specific fuel consumption rate and hydrocarbon (HC) emissions.

A further objects of the present invention is to provide a compression ignition type direct injection (or Diesel) internal combustion engine in which mixture is prepared by intense turbulence to enhance the air utilization of the fuel for the latter half of the injection period, thereby to reduce the emission of black smoke, shorten the combustion period, and reduce the specific fuel consumption.

In order to achieve the aforementioned objects, the inventors have discovered the following and conceived an internal combustion engine which continuously generates turbulence during the combustion period to promote the introduction of air into fuel droplets:

(1) As the worst defect of the prior art, the generation of turbulence is concentrated during a limited period and does not continue for the whole combustion period.

(2) In the direct injection type engine in which fuel is directly injected into the cylinder from a fuel injection nozzle, the turbulence or flow generation is stressed on the preparation of the mixture on or before the combustion and is insufficient in the middle and latter parts of the combustion cycle.

(3) The injected fuel is denser close to the port of the injector but thins close to the leading portion of the fuel spray. From the standpoint of introducing air into the fuel droplets, the necessity for imparting the turbulence to the leading portion of the fuel droplets is low but increases in a position close to the injection port.

(4) Introduction of air into the fuel droplets is promoted by swirl and by the turbulence generated by swirl. Moreover, the necessity for promoting air introduction is lower for the leading portion of the fuel droplets but higher for the base portion. In order to meet these two requirements, for swirl, the promotion of air introduction is effected by bringing the fuel droplets closer to the wall surface of the recess. For turbulence in the cylinder, promotion is effected by making the aforementioned distribution. Moreover, the latter should have continuity.

According to the present invention, there is provided a direct injection type reciprocating internal combustion engine comprising a cylinder block having a cylinder bore, a cylinder head mounted on the cylinder block, a piston reciprocally fitted in the bore of the cylinder block and defining a combustion chamber together with the cylinder block and the cylinder head, intake means for feeding the combustion chamber with intake air and having swirl means for swirling the intake air being introduced into the combustion chamber, a main recess being formed in the combustion chamber for accelerating the swirled intake air which is prepared and introduced by the swirl means, an auxiliary recess formed on a side wall of the main recess along which the swirled intake air flows for generating secondary swirl in the auxiliary recess different from that of the swirled intake air and for generating turbulence between the swirled intake air and the secondary swirl, and fuel feed means comprising a fuel injector, connected to a fuel supply source, comprising a fuel injector nozzle disposed near by an upstream portion of the auxiliary recess in the flow direction of the swirled intake air in the main chamber, the fuel injection nozzle being directed to side wall of the main recess near by downstream portion of the auxiliary recess in the flow direction of the swirled intake air therein, for supplying the injected fuel along the flow direction of swirled intake air, whereby the introduction of air into fuel droplets fed from the fuel injector is promoted by the swirled intake air and the secondary swirl, whereby the combustion efficiency of the internal combustion engine is improved.

According to the present invention, the swirl of the intake air, which is generated in the suction stroke of the internal combustion engine by the swirl means such as an intake valve or an intake port, is suitably introduced in synchronization with the rise of the piston so that it flows stably and smoothly.

In addition, the secondary swirl different from the primary swirl of the aforementioned swirled intake air is generated in the auxiliary recess to further generate turbulence therebetween.

Since this turbulence is generated by making effective use of the swirls and is generated continuously until the attenuation of the swirls without adversely affecting the swirls, they are not restricted to a certain period but continue for a long time.

Due to the generation and continuation of the turbulence as described, the introduction of air into the fuel droplets supplied from the fuel injector is promoted so that the subsequent combustion is efficiently promoted to shorten the combustion period and to improve the combustion efficiency to a remarkable extent.

Therefore, the internal combustion engine according to the present invention has a number of practical advantages such that the swirls are effectively used to generate a satisfactory amount of turbulence in suitable positions in the main recess and to ensure the generation of such turbulence, thereby to improve a variety of performance characteristics as a result of interactions between the swirls and the turbulence.

More specifically, the portion of the jet of fuel droplets which faces the main recess is sufficiently supplied with intake air, and another portion of the same facing the auxiliary recess is supplied with a considerable air flow so that the introduction of the air can be further promoted. Accordingly, the promotion of air introduction is maintained in spite of the change in the flow pattern and the reduction in the turbulence generating capacity due to the reduction in the speed of the engine.

Since the present invention does not make use of the squish, the top clearance, i.e., the clearance h between the piston top and the cylinder head at the TDC, may is increased to $1.0 < h < 1.5$ mm for a premixed spark ignition type high squish engine, and to $h > 1.5$ mm for an engine using little squish. This increase in the top clearance h is advantageous for the manufacture of the engine. There is attained another effect that neither the emission of HC nor the heat loss is increased by the quenching action of that top clearance h. If the clearance h is reduced, more specifically, no flame is allowed to enter the clearance by the quenching action to lower the wall temperature. In the premixed spark ignition type internal combustion engine or the stratified charge type internal combustion engine having a compression ratio no more than 12, the top clearance h is specified to a preferable value of $h > 1.2$ mm and to a more preferred value of $1.5$ mm $< h > 2.0$ mm in view of performance requirements. In the compression ignition type internal combustion engine or the stratified charge type internal combustion engine having a higher compression ratio, on the other hand, the top clearance h should be more than 0.6 mm to provide the desired compression ratio. According to the present invention, moreover, since turbulence is not generated by squish, the turbulence generation is not dependent upon the piston speed so that generation is effected even at low speeds, thereby to enhance the fuel economy and reduce exhaust emissions at low speeds.

According to the present invention, furthermore, there is attained a further effect that the aforementioned top clearance h is sufficiently large that the cooling loss is decreased, maintaining fuel economy for partial load conditions. If the piston is formed with a main recess and an auxiliary recess, the temperature at the piston top becomes higher than of the circumferential portion of the combustion chamber at the lower face of the head. As a result, the formation of the main and auxiliary recesses at the piston side assures less heat loss from the wall than in the case where the combustion chamber is formed in the side of the cylinder head or the cylinder block.

DESCRIPTION OF THE PREFERRED EMBODIMENTS

The present invention will now be described with reference to the accompanying drawings.

Figure 1:
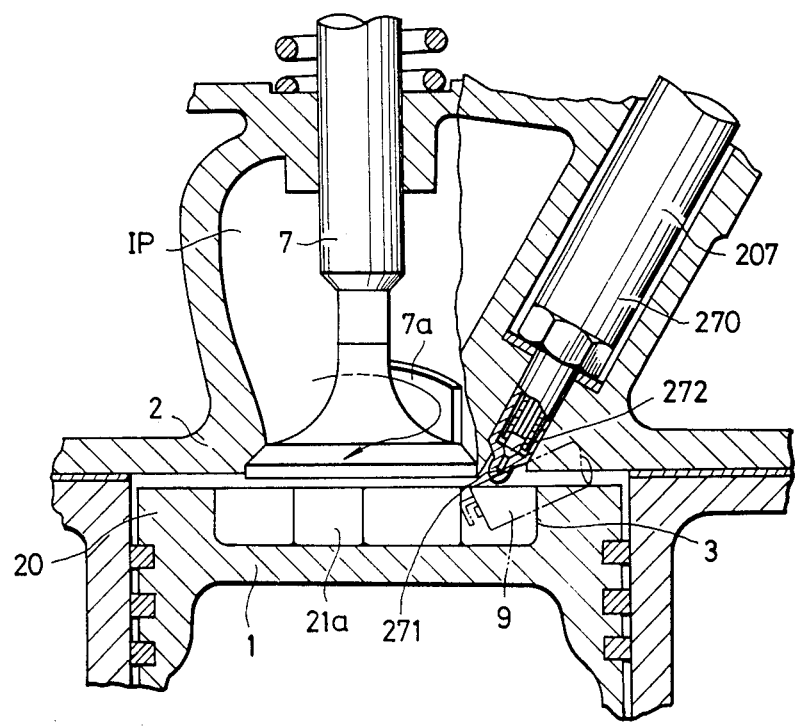
FIG. 1 is a longitudinal sectional view showing a direct injection type gasoline engine according to a first embodiment of the present invention.
Figure 2:
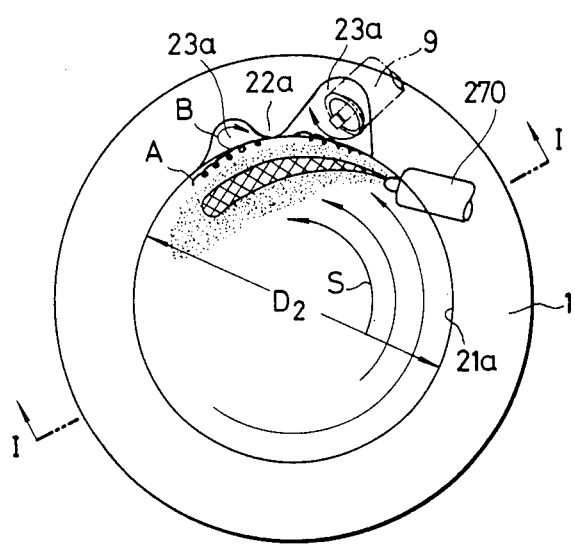
FIG. 2 is a transverse section showing the gasoline engine of FIG. 1.

A first embodiment of the present invention is related, as shown in FIGS. 1 and 2, to a direct injection type internal combustion engine in which gasoline is injected at a metered rate directly into a main recess 21a of a combustion chamber by the action of a fuel injector.

The reciprocating type gasoline engine of the present invention has a fuel feed device 207 which includes a swirl injector 270 extending through a cylinder head 2 and having an injector port 271 on the inside of the combustion chamber 3; an air flow meter (not shown) for metering the flow rate of the intake air in an intake passage IP; a tachometer (not shown) for detecting the rotational speed of the engine; a control unit (not shown) for generating a signal to control the injection rate of gasoline according to the operating state of the engine on the basis of the intake air flow rate and the engine speed and taking the temperature of engine cooling water into consideration; and a fuel feeder for feeding the injector with pressurized gasoline at a rate instructed by the control signal.

The swirl injector 270 tangentially introduces pressurized gasoline at a predetermined rate from the fuel feed device into a swirl chamber 272 through a communication port to generate an intense swirl in the swirl chamber 272 so that a thin film of gasoline is injected at a wide injection angle from the injection port 271 into the main recess 21a in the top 20 of the piston 1.

An intake valve 7, acting as the intake device, is formed with a shroud 7a for generating a swirl in the intake air.

Here, the reciprocating gasoline engine of the first embodiment being described is provided with the main recess 21a (as shown in solid and broken lines) formed in the top 20 of the piston 1 and having a truly circular transverse section, and two auxiliary recesses 23a (as shown in solid lines) which communicate with the main recess 21a through an arcuate projection or land 22a and defined by two arcs and which have larger radii of curvature than those of the projections 22a.

The reciprocating gasoline engine having the construction thus far described according to the first embodiment is equipped with the swirl injector for injecting fuel earlier than the injection timing of the Diesel engine, thus attaining a relatively large angle of divergence and excellent atomization so that the fuel droplets can spread over an inscribed circle $D_2$. By the action of an intake swirl S generated by the shroud 7a of the intake valve 7, the fuel droplets are swirled and are mixed and gasified near TDC so that an intense swirl of the mixture is accelerated and introduced into the main recess 21a of the piston top to generate turbulence at the turbulence lips provided by the two projections 22a. In the auxiliary recesses 23a, moreover, there are generated secondary swirls B in addition to the aforementioned swirl S so that turbulence A is generated between the two swirls. As a result, that portion of the jet of the fuel droplets which faces the main recess 21a is supplied with sufficient air by the aforementioned swirl S, and the other portions of the same facing the auxiliary recesses are supplied with sufficient air by the aforementioned turbulence A and swirls B. After that, ignition takes place slightly before TDC to effect prompt combustion. Incidentally, in the present embodiment, the compression ratio $\epsilon$ is 13 to 15, and the top clearance h is 2.0 mm.

Moreover, the gasoline engine of the present invention has highly efficient combustion, the specific fuel consumption is improved, and unburned noxious components such as the hydrocarbons are prevented from being emitted.

Moreover, the reciprocating gasoline engine of the first embodiment supplies gasoline in the form of a liquid film in the most proper position and at the most proper angle into the main recess 21a of the top 20 of the piston 1 so that the gasoline distribution can be made uniform by the action of the swirl S of the intake air. Since directly metered gasoline is fed to the combustion chamber, moreover, the engine is freed from the defect of gasoline remaining in the intake passage.

Figure 3:
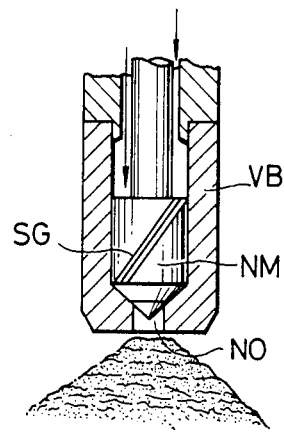
FIG. 3 is a longitudinal section showing a fuel injector to be used with the gasoline engine shown in FIGS. 1 and 2.
Figure 4:
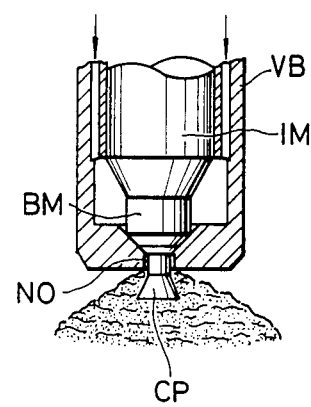
FIG. 4 is similar to FIG. 3 but shows another fuel injector.

Still further, the reciprocating gasoline engine of the first embodiment can also use an injector having a large angle of injection, although the swirl injector 270 is preferred. For example, the gasoline engine can also use injectors as shown in FIGS. 3 and 4 in addition to a single hole injector. Specifically, the injector shown in FIG. 3 is of the slit type in which a nozzle member NM fitted in a valve body VB is formed with a spiral groove SG in its outer circumference. The gasoline is spirally introduced so that it is injected with a centrifugal force and at a large angle of divergence from a nozzle outlet NO.

On the other hand, the injector shown in FIG. 4 is of the so-called "collision valve" construction in which the gasoline is injected from the nozzle outlet NO to collide against collision member CP, which is fixed through a bar member BM to an inner member IM fitted in the valve body VB, so that the gasoline is injected in the form of the thin film at a large injection angle in a varying direction from the collision member CP.

Figure 5:
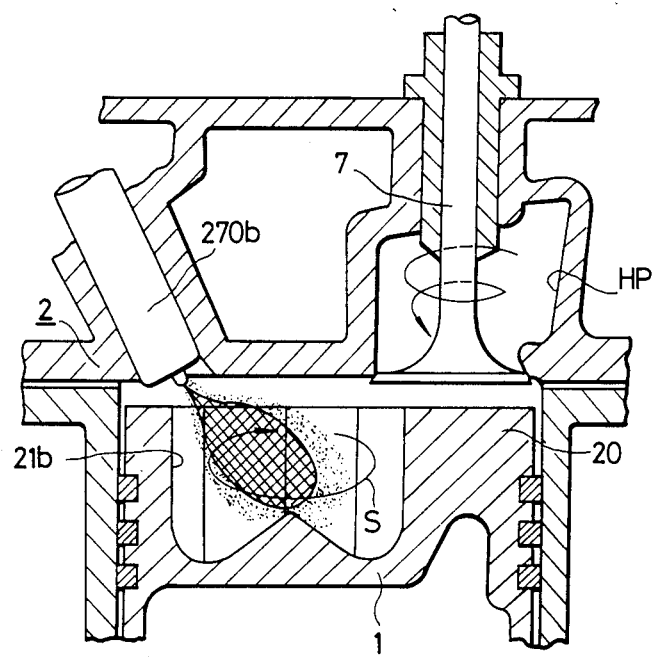
FIG. 5 is similar to FIG. 1 but shows a Diesel engine according to a second embodiment of the present invention.
Figure 6:
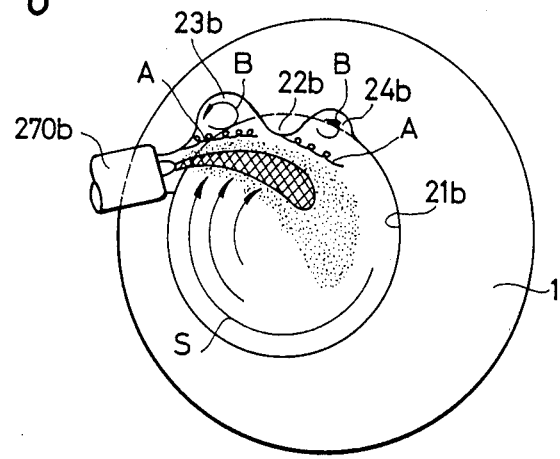
FIG. 6 is a transverse sectional view showing the Diesel engine of FIG. 5.

Next, a second embodiment will be described directed, as shown in FIGS. 5 and 6, to a compression ignition type direct injection (Diesel) internal combustion engine. The Diesel engine of this second embodiment is featured in that a properly controlled swirl is generated in the combustion chamber; in that a main recess 21b is formed eccentric to the center axis of the piston 1; in that the fuel droplets from the fuel injector arranged eccentrically and at a predetermined angle with respect to the center axis of the main recess 21b are injected toward the inner wall at one side of the opening of the main recess 21b; and in that the piston 1 is formed at its upper portion 20 with both a main recess (as shown in solid and broken lines) having a truly circular transverse section and two auxiliary recesses 23b and 24b (as shown in solid lines) communicating with the main recess 21b through an arcuate projection 22b defined by two arcs 23b and 24b having larger radii of curvature than that of the projection 22b. Here, the auxiliary recesses 23b and 24b may be made progressively smaller in their radii of curvature, as shown, in the swirling direction, but may be generally identical so that a satisfactory distribution of air introduction can be obtained for the fuel droplets.

The Diesel engine according to this second embodiment is constructed, as shown in FIGS. 5 and 6, such that the main recess 21b of a bottomed cylindrical shape forming the combustion chamber is eccentrically formed in the central portion of the flat face of the top 20 of the piston.

In the present embodiment, the compression ratio $\epsilon$ is 18, and the top clearance h is 0.8 mm.

The fuel injector is formed, as shown in FIG. 5, of a swirl injector 270b which extends through the cylinder head 2. The cylinder head 2 is arranged, as shown in FIG. 5, with the intake valve 7 and the exhaust valve surrounding the swirl injector 270b. The intake passage for the intake valve 7 is formed as a helical port HP to provide swirling at a predetermined swirling ratio.

In the Diesel engine having the construction thus far described according to this embodiment, intake air, which has been swirled by the helical port HP, is compressed as the piston 1 rises. When the piston 1 rises, the swirling of the intake air is accelerated and the air is introduced into the main recess 21b with a suitable swirling velocity. The swirl S is not attenuated, but is effectively used by the projection 22b projecting into the main recess 21b so that it can be converted at any time into turbulence to form a highly turbulent layer A.

In the Diesel engine of the second embodiment, moreover, the auxiliary recesses 23b and 24b can generate the two secondary swirls B different from the aforementioned swirl S to promote swirling with a view to accommodate the two swirls B and to generate the turbulence A between the aforementioned swirl S and the secondary swirls B.

When the piston 1 comes close to the TDC, e.g., to an angle of 20 to 5 degrees before the TDC, fuel injection is started in a three-dimensional fuel droplet pattern of a hollow conical shape having a tangential velocity component and a large angle of divergence so that the fuel droplets come close to one side inner wall of the opening of the main recess 21b.

When the piston 1 comes to a position of about 10 degrees before the TDC, the fuel droplets near the inner wall of the main recess 21b of the piston 1 are moved in the depthwise direction of the main recess 21b by the action of the aforementioned swirl S so that they are diffused and mixed by the combined action of the aforementioned turbulence A until they form a satisfactory mixture over all the main recess 21b and the auxiliary recesses 23b and 24b while being evaporated by the hot air which has been adiabatically compressed at the end of the compression stroke. More specifically, that portion of the jet of the fuel droplets which faces the center of the main recess 21b is supplied with sufficient air by the aforementioned swirl S, and the other portions of the same facing the auxiliary recesses 23b and 24b are efficiently supplied with air by the actions of the aforementioned turbulence A and swirls B.

The subsequent ignition takes place from the vicinity of the inner wall at one side of the main recess 21b. The flame propagates while being swirled by the swirl S to the circumference of the main recess 21b. When the piston passes the TDC, the clearance between the flat face of the top of the piston 1 and the lower wall face of the cylinder head 2 is increased so that the gas in the main recess 21b intensely spurts through the opening so that it is completely burned.

Since the Diesel engine of the second embodiment uses the swirl injector 270b having a small fuel penetration, the fuel droplets will not collide against the inner wall of the main recess 21b. As a result, the fuel droplets are neither made coarse nor formed into a liquid film by collisions. In addition, the swirl injector 270b effects excellent atomization of fuel, and then, the Diesel engine has advantages that combustion is promoted and burned completely by forming the swirl S and the turbulence A, with the latter being generated by making use of the swirl S.

As a result, the Diesel engine of the second embodiment suppresses smoke generation remarkably well and reduce emissions such as hydrocarbons (HC), carbon monoxide (CO) and carbon particulates. The fuel droplets injected from the swirl injector 270b are carried on the swirl S to the vicinity of the inner wall of the main recess 21b and are continuously distributed by the turbulence A. Therefore, the Diesel engine of the second embodiment has an advantage that the ignition delay can be shortened, thereby reducing the noise output from the engine.

Moreover, the Diesel engine of the second embodiment has an advantage that the engine friction is low, hence enhancing the mechanical efficiency and reducing the specific fuel consumption rate additionally.

Still further, the Diesel engine of the second embodiment need not form any intense swirl so as to prevent the collisions of the fuel against the inner walls of the main recess 21b and the auxiliary recesses 23b and 24b because it uses the swirl injector 270b having a low fuel penetration. Also, the resistance to the flow in the intake port and in the helical port in the vicinity of the intake valve can be reduced so that the volumetric efficiency (V) of the intake air into the combustion chamber can be enhanced. The Diesel engine of the second embodiment has still another advantage in that the flow rate of the intake air is increased together with the flow rate of the fuel to be burned, thereby augmenting the engine output.

Although the present invention has been described in connection with the foregoing embodiments, it is not limited thereto.

In addition, numerous design changes and modifications can be made without departing from the spirit and scope of the invention.

Figure 7:
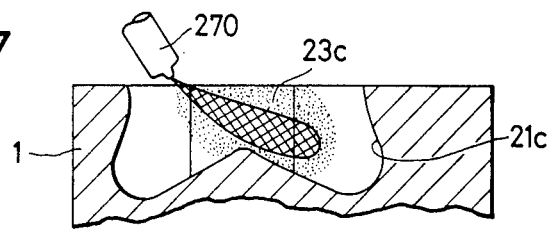
FIGS. 7 and 8 are sectional views showing a third embodiment of the present invention.
Figure 8:
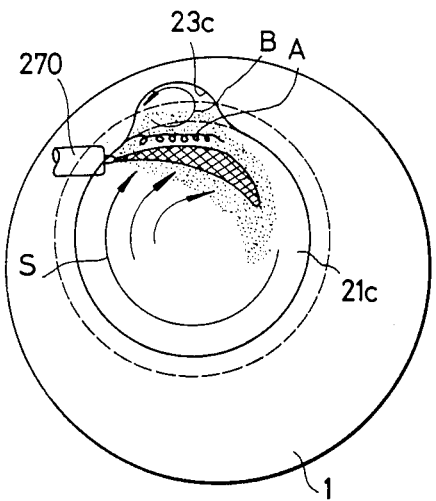

Specifically, the shapes and constructions of the recesses and lands, which are formed in the upper portion of the piston in accordance with the present invention, are not limited to those of the foregoing embodiments. As shown in FIGS. 7 and 8, a main recess 21c and an auxiliary recess 23c may be directly connected, rather than being connected through a plurality of lands. The main recess 21c may have a bottom portion formed into a toroidal shape. In addition, the auxiliary recess may be arranged asymmetrically with respect to the axis of the main recess. A plurality of auxiliary recesses may be formed. These modification provides operational effects substantially similar to those of the foregoing embodiments.

Although as described the piston top is provided with the main and auxiliary recesses and the land or lands, the present invention is not limited thereto. Even in the case of an engine having a combustion chamber of a predetermined displacement formed between the lower face of the cylinder head and the top face of the piston, there can be attained an effect similar to the aforementioned in which the generation and maintenance of suitable swirls and turbulence is ensured to thus improve the combustion efficiency if the main and auxiliary recesses and the land or lands satisfy the specified relationships.

We claim:

1. A direct injection type reciprocating internal combustion engine comprising:
    a cylinder block having a cylinder bore;
    a cylinder head mounted on said cylinder block;
    a piston reciprocally fitted in the bore of said cylinder block and defining a combustion chamber together with said cylinder block and said cylinder head;
    intake means for feeding said combustion chamber with intake air and having swirl means for swirling the intake air being introduced into said combustion chamber, a main recess being formed in said combustion chamber for accelerating the swirled intake air which is prepared and introduced by said swirl means;
    an auxiliary recess formed on a side wall of said main recess along which the swirled intake air flows for generating secondary swirl in said auxiliary recess in a direction opposite that of said swirled intake air and for generating turbulence between said swirled intake air and said secondary swirl, an acute angle being formed between an extended line which is tangential to a wall surface of the main recess and an upstream side wall surface of the auxiliary recess which communicates with the main recess, said auxiliary recess upstream side wall surface being formed to project radially outwardly of the main recess and said extended tangential line, and
    fuel feed means comprising a fuel injector, connected to a fuel supply source, comprising a fuel injector nozzle disposed to supply fuel directly into the main recess and located nearby an upstream portion of said auxiliary recess with respect to the flow direction of the swirled intake air in said main chamber, said fuel injector nozzle being tangentially directed to wall surface of said main recess nearby a downstream portion of said auxiliary recess in the flow direction of the swirled intake air therein, said fuel injection nozzle supplying the injected fuel along the flow direction of swirled intake air, such that the introduction of air into fuel droplets fed from said fuel injector is affectively accelerated by said swirled intake air and said secondary swirl,
    whereby the combustion efficiency of said internal combustion engine is improved.

2. The direct injection type reciprocating internal combustion engine according to claim 1, wherein said fuel injector is a collision valve construction in which the fuel is injected from a nozzle outlet to collide against a collision member, said collision member is fixed through a bar member to an inner member fitted in a valve body, thereby the fuel is injected in the form of a thin film at a large injection angle in a varying direction from the collision member.

3. The direct injection type reciprocating internal combustion engine according to claim 1, wherein the distance between opposed inner walls of said auxiliary recess is gradually increased toward said main recess.

4. The direct injection type reciprocating internal combustion engine according to claim 1, wherein said main recess is formed with a plurality of auxiliary recesses and said auxiliary recesses are identical in the direction of said swirled intake air and in the direction of fuel injection of said fuel injector.

5. The direct injection type reciprocating internal combustion engine acording to claim 1, wherein said main recess is formed with a plurality of auxiliary recesses and said auxiliary recesses are made progressively smaller in the direction of said swirled intake air and in the direction of fuel injection of said fuel injector.

6. The direct injection type reciprocating internal combustion engine according to claim 1, wherein said main recess is formed with a pulrality of auxiliary recesses and said auxiliary recesses are communicating with said main recess through projections.

7. The direct injection type reciprocating internal combustion engine according to claim 1, wherein the fuel injector directly injects fuel at a predetermined angle into said main recess so that intake air is adiabatically compressed by the rise of said piston to compress, ignite and burn fuel which is directly injected and fed into said main recess.

8. The direct injection type reciprocating internal combustion engine according to claim 1, wherein opening of said combustion chamber is throttled.

9. The direct injection type reciprocating internal combustion engine according to claim 1, wherein said combustion chamber is formed on a top flat surface of said piston.

10. The direct injection type reciprocating internal combustion engine according to claim 1, wherein said fuel injector comprises a swirl injector for injecting the fuel at a wide injection angle.

11. The direct injection type reciprocating internal combustion engine according to claim 10, wherein said fuel injector is of a slit type in which a nozzle member fitted in a valve body is formed with a spiral groove in its outer circumference, and is injected with a centrifugal force and at a large angle of divergence from a nozzle outlet,
    thereby the fuel is being introduced spirally.

12. The direct injection type reciprocating internal cumbustion engine according to claim 1, further comprising ignition means for igniting and burning injected fuel to ignite and burn fuel in said combustion chamber.

13. The direct injection type reciprocating internal combustion engine according to claim 12, wherein said ignition means is provided in the cylinder head and an ignition point of said ignition means is arranged near by a boundary of said main and auxiliary recesses.

14. The direct injection type reciprocating internal combustion engine according to claim 1, wherein said side walls of auxiliary and main recesses are cylindrically shaped.

15. The direct injection type reciprocating internal combustion engine according to claim 14, wherein a bottom wall of said main and auxiliary recesses are formed with a flattened bottom.

16. The direct injection type reciprocating internal combustion engine according to claim 14, wherein a bottom wall of said main recess has a cone-shaped raised area projecting from it.

* * * * *